United States Patent [19]

Parada et al.

[11] 4,263,328

[45] Apr. 21, 1981

[54] TABLETED GASIFIED CANDY

[75] Inventors: Maya Parada, Brooklyn, N.Y.; Marvin J. Rudolph, Bethel, Conn.

[73] Assignee: General Foods Corporation, White Plains, N.Y.

[21] Appl. No.: 88,481

[22] Filed: Oct. 26, 1979

[51] Int. Cl.$^3$ ............................................. A23G 3/00
[52] U.S. Cl. .................................. 426/103; 426/453; 426/572; 426/660
[58] Field of Search ................. 426/96, 103, 453, 572, 426/660

[56] References Cited

U.S. PATENT DOCUMENTS

| | | |
|---|---|---|
| 3,012,893 | 12/1961 | Kremzner ............................ 426/572 |
| 3,169,888 | 2/1965 | Ryan et al. ............................ 426/103 |
| 3,741,795 | 6/1973 | Signorino ............................ 426/103 |
| 4,127,645 | 11/1978 | Witzel .................................. 426/548 |
| 4,159,210 | 6/1979 | Chen .................................... 426/103 |

OTHER PUBLICATIONS

Little, et al., Tablet Making, Northern Pub. Co. Ltd., Liverpool, England, 1963 pp. 47-51.

*Primary Examiner*—Jeanette M. Hunter
*Attorney, Agent, or Firm*—Daniel J. Donovan; Bruno P. Struzzi; Thomas R. Savoie

[57] ABSTRACT

Tablets of finely divided gasified candy are prepared by direct compression utilizing a binding agent having a moisture control of 1-2% or below.

10 Claims, No Drawings

TABLETED GASIFIED CANDY

BACKGROUND OF THE INVENTION

1. Field of the Invention

This invention relates to a confection composition. More particularly, it relates to a gasified candy confection prepared with a predetermined geometry. This invention especially relates to gasified candy in tablet form.

2. Description of the Prior Art

Gasified candy is a hard candy containing gas, such as carbon dioxide, as disclosed in U.S. Pat. No. 3,012,893 of Kremzner and Mitchell, U.S. Pat. No. 3,985,909 and U.S. Pat. No. 3,985,910 of Kirkpatrick and U.S. Pat. No. 4,001,457 of Hegadorn which are incorporated herein by reference. Such a candy is made by the process which comprises melting crystalline sugar, contacting such sugar with gas at a pressure of 50 to 1,000 psig for a time sufficient to permit incorporation in said sugar of 0.5 to 15 $cm^3$ of gas per gram of sugar, maintaining the temperature of said sugar during said adsorption above the solidifcation temperature of the melted sugar, and cooling said sugar under pressure to produce a solid amorphous sugar containing the gas. Upon the release of the pressure, the solid gasified candy fractures into granules of assorted sizes.

The resultant product contains 1% to 4% water and most typically 2% to 3% water by weight of the total composition. (All figures expressed herein as a percentage are in terms of weight percent, unless specifically expressed to the contrary.) Lower levels of moisture are not practicably obtainable because the additional heat necessary to drive off the water causes the candy melt to caramelize or burn, resulting in an off-flavor, undesirable product. High moisture levels result in a soft, sticky matrix which rapidly liberates the entrapped gas and is thus not storage stable.

The gasified candy, when placed in the mouth, produces an entertaining but short-lived popping sensation. As the candy is wetted in the mouth the candy melts and the gas escapes. The tingling effect in the mouth is sensational but short.

When the solidified gasified candy is fractured by the release of pressure from the preparation vessel, the resultant granulated pieces are irregular, randomed-sized pieces having the appearance of pieces of broken glass or what might be termed sharp-faced pieces of gravel. The granulated pieces are sieved to provide the gasified candy in a range of particle sizes.

The gas is contained within the gasified candy is a series of bubbles which, when prepared by the methods disclosed in U.S. Pat. Nos. 3,012,893, 3,985,909, 3,985,910 and 4,001,457, have a size ranging from 3 to 1000 microns, although most of the bubbles have a diameter of between 60 and 80 microns. It is the release of the gas from these bubbles which produces the popping sensation when the gasified candy is permitted to melt in the mouth.

Active materials in particulate form may be shaped into tablets by one of several general methods—compression of dry particulate material or molding of a moist material. Compression is the most frequently employed and is subdivided into three methods, i.e., dry granulation, wet granulation and direct compression. The latter is preferred since it employs the fewest operating steps and avoids exposure to water which would adversely effect many of the active materials. However, direct compression tableting has limited use because many active materials have poor compaction properties and cannot be directly compressed alone in dry form to produce a coherent mass. Therefore, most dry materials require the use of a binding agent in order to form a useful tablet.

Tablets must be capable of disintegrating at a desired rate, usually in a moist environment, to release the active ingredient for its intended purpose. In addition, the tablet must possess a certain hardness but must not be excessively friable. These properties are often interrelated so that tablet hardness is often directly proportional to tablet friability. Dusting and crumbling of a tablet are undesirable as are breaking and chipping.

Fortunately, tableting ingredients have been developed to permit tableting of dry materials having poor compaction properties to produce tablets of desired hardness, friability and disintegration. Tablet formulations thus may include a binding or compaction agent as well as, disintegrants, flavorants, coloring agents, diluents, lubricants and the like.

U.S. Pat. No. 3,639,169 of Broeg et al. relates to a method of preparing a multicomponent direct compression vehicle for the manufacture of tablets. The vehicles disclosed have sugar as the predominant component and are prepared by forming a dry mixture of all tablet ingredients, except the active ingredient, compacting the mixture into a compact, nonfriable sheet and breaking up the sheet to form particles of the multicomponent vehicle. The disclosed method is specifically concerned with the compaction aids which form a portion of the tableting vehicle. Included in an extensive list of useful compaction aids are such materials as sorbitol, lactose, starch, hydrolyzed polysaccharide derivatives, certain sugar agglomerates and a free-flowing particulate composition. The sugar agglomerates are prepared by spraying particulate solid sugar with an aqueous solution of a polyhydroxy binder, such as glycerol, mannitol or a sugar, agitating the mixture to form agglomerates of a general spherical shape and finally drying the coated sugar agglomerates. The free-flowing particulate composition is an inert edible diluent dispersed in a matrix of a hydrophilic hydratable high polymer. Illustrative diluents include mono and disaccharides while the hydratable polymer may be starch, agar, dextrin, cereal flour, and the like. The diluent and the polymer are admixed with sufficient water to hydrate the polymer and the resultant dispersion is dried, preferably by drum drying, producing flakes of the particulate composition. The direct compression vehicle is blended with an active material and a lubricant, if necessary, and compressed to form a tablet. The patentees describe an active material as any material intended for ingestion having a beneficial or desirable effect on the user including such things as therapeutic materials (anesthetics, antiobiotics, vitamins, aspirin, etc.), foodstuffs (cocoa, dried oats, fruit flakes, etc), edible dyes and other food additives. The use of the direct compression vehicle in a tableted confection is neither specifically taught nor indirectly suggested.

U.S. Pat. No. 3,622,677 of Short et al. relates to a binder-disintegrant ingredient for a directly compressed tablet. The binder-disintegrant is a starch material derived from compacted corn starch by subjecting starch raw material to pressure in the presence of water to effect distortion and fracture of the granules and to produce adhesion between the particles of the resultant mass. The starch raw materials are compacted in the presence of water, and then ground and classified into varying particle size fractions. Typically, the moisture content of this dual function compacted starch powder is in the range of 9 to 16 percent.

It is an object of this invention to provide a gasified candy in uniformly shaped pieces.

It is another object of this invention to prepare gasified candy in a tablet form by a direct compression process.

It is a further object of this invention to prepare a gasified candy confection which produces a mouth-feel sensation more prolonged than is obtained with the gasified candy produced heretofore.

SUMMARY OF THE INVENTION

In accordance with the present invention it has been found that tablets of gasified candy can be prepared so as to produce a prolonged sizzling sensation when eaten if a binder, such as a carbohydrate material, comprises a portion of the tablet. More particularly, the invention is directed to a directly compressed tableted confection of gasified candy having resistance to breaking and crumbling and being capable of disintegrating when placed in the mouth to produce a sizzling sensation which comprises:

(a) a gasified candy in a finely divided state containing 0.5 to 15 cm$^3$ of gas per gram of candy and (b) a quantity of an excipient binder for said gasified candy, said binder comprising carbohydrate material and said quantity being sufficient to provide substantial binding action so as to produce a tablet of gasified candy having (i) resistance to breaking and crumbling and (ii) controlled disintegration to produce a sizzling sensation from the gasified candy when said tablet is contacted with moisture in the mouth.

This invention is also directed to a method of preparing a tablet confection of gasified candy which comprises:

(a) preparing a melt of sugar, (b) gasifying the melt under superatmospheric pressure, (c) solidifying the gasified melt under pressure trapping bubbles of gas within the solid sugar, (d) sub-dividing the solid gasified sugar into finely divided particles, (e) admixing the finely divided particles of gasified candy with a quantity of an excipient binder for the carbonated candy, said binder comprising carbohydrate material, and (f) directly compressing the admixture of step (e) into a tablet, said quantity of binder being sufficient to provide substantial binding action to produce a tablet of gasified candy having (i) resistance to breaking and crumbling, and (ii) controlled disintegration to produce a sizzling sensation from the gasified candy when said tablet is contacted with moisture in the mouth.

This invention is further directed to a method of preparing an excipient binder for use in tableting finely divided gasified candy which comprises:

(a) heating an aqueous solution of starch at an elevated temperature and for a sufficient period of time to hydrolyze said starch, (b) contacting the hydrolyzed starch solution with finely divided carbohydrate material whereby the carbohydrate material is coated with the solution, (c) drying the coated carbohydrate material to a moisture level of less than about 3.0 wt. %.

DESCRIPTION OF THE PREFERRED EMBODIMENTS

The present invention relates to tablets of gasified candy which produces a prolonged sizzling sensation when placed in the mouth. This pleasant mouthfeel is distinct from the short popping sensation produced by pieces of granulated gasified candy available heretofore, particularly the gasified candy produced by the methods disclosed in U.S. Pat. Nos. 3,012,893, 3,985,909, 3,985,910 and 4,001,457, wherein following solidification of the gasified candy, it fractures into granulated pieces upon release of the pressure from the preparation vessel.

Briefly, the tableted confection of the present invention consists of a mixture of finely divided pieces of gasified candy and an excipient binder containing a carbohydrate material whose moisture content is sufficiently low to be compatible with the carbonated candy thereby maintaining the integrity of the gas bubbles of the candy until it is desired to eat the confection. The mixture of gasified candy and binder is formed into a compact mass by a direct compression tableting process at a pressure effective for maintaining the integrity of the gasified candy and producing a hard tablet resistant to breaking and crumbling but capable of disintegrating when placed in the mouth to produce a sustained sizzling sensation.

Optionally, a final hard coat of edible shallac or varnish, colored if desired, may be applied to the tableted confection. Alternately, a final coating of sugar, either in hard or powdered form, may be applied to the outer surface of the tablet. This sugary coating can be colored if desired. In addition or alternately, a polished waxy coating of, for example, beeswax or carnauba wax, may be applied to the outer surface of the tableted confection.

The gasified candy component of the instant confection is a hard sugar product having bubbles of gas entrapped therein and is conveniently produced according to the processes disclosed in U.S. Pat. Nos. 3,012,893, 3,985,909, 3,985,910 and 4,001,457 and discussed hereinbefore. The gasified candy can be prepared from any of the commercially-available sugars employed in the confectionary industry. Thus, such sugars as glucose, fructose, sucrose, lactose, etc. alone or in combination may be employed in practicing the instant invention. A combination of sucrose and lactose provides a preferred product. A mixture of sucrose with corn syrup (containing glucose, maltose, dextrin) is also satisfactory. A mixture of sucrose, lactose and corn syrup in a weight ratio of 52:27:21 is particularly preferred, providing an excellent gasified hard product particularly characterized by its good gas retention and reduced stickiness on standing. A 40:40:20 mixture of sucrose, lactose and corn syrup is especially preferred since it additionally provides good high temperature stability and can withstand significantly higher pressures in the tableting process than the 52:27:21 formulation. The moisture content of the gasified candy is typically between 1.0 and 5.0%. Preferably, it is between 2.0 and 3.0%.

The gases used to prepare the gasified candy of the present invention may be any of the commonly-available gases which are substantially unreactive with the sugar or sugars being employed and include such gases as, carbon dioxide, nitrogen or air but carbon dioxide is preferred. The gasified candy contains 0.5 to 15, preferably 2 to 7, cm$^3$ of gas per gram of candy.

Coloring, flavoring and/or active ingredients may be incorporated in the gasified candy to enhance the eye appeal of the confection and to provide a pleasing taste to complement the sizzling effect of the gasified candy. Commercial colorings are available in a variety of shades for incorporation into foodstuffs and may be employed in this invention. The choice will be dependent on the desired effect and, possibly, the flavoring, if any, to be incorporated into the confection. Flavors such as wintergreen, spearmint, peppermint, birch, anise and such fruit flavors as cherry, lemon-lime, orange, grape, etc. and mixtures thereof and the like may be used satisfactorily with the confection of the present invention and are available commercially. Active ingredients are also available for incorporation in the confection to provide a product useful as a breath freshener. The amount of coloring, flavoring and/or active ingredient used will vary depending on tye type used, individual taste preferences, the specific gasified candy employed and other consierations well known to those skilled in the confectionary art. Preferably, these ingredients are added to the sugary melt after the desired moisture level is obtained by evaporation of the melt, under vacuum.

The gasified candy is employed in finely divided form and is most easily provided in the form following the solidification of the gasified sugar in the preparation vessel. The sudden release of pressure from the vessel, fractures the gasified sugar into granulated pieces in a wide range of assorted sizes. Although finely divided pieces of gasified candy in a variety of sizes may be employed in the invention, it is preferred that the pieces be sieved to provide uniform sized pieces. In general, smaller sized pieces are preferred. Gasified candy having a particle size distribution of $-4$ to $+40$ U.S. Sieve Series can be employed but $-20$ to $+40$ or $-14$ to $+30$ U.S. Sieve Series are preferred.

A sugarless form of gasified candy can also be employed in this invention by substituting sugarless material, such as sorbitol, for the sugar in the gasified candy preparation described herein.

The gasified candy may be prepared as follows:

The sugar or mixtures of sugars are placed in a closed, heated vessel provided with a mixer. A small quantity of water is added to dissolve the sugar and other additives. Heat is applied to the vessel sufficient to dissolve and melt the sugars. The mixture is then evaporated to produce a melt having 1-4 weight percent, preferably 2-3 weight percent, of water. The required amounts of coloring, flavoring and/or active ingredient are usually added when the desired water content is achieved. The evaporation may be conducted at atmospheric pressure or, preferably, under a vacuum of up to 15 inches of mercury. Melt temperatures of between about 280°-320° F. are necessary to reach the desired moisture content. Care must be exercised, of course, to prevent caramelizing the sugary mix.

The sugar melt is gasified by introducing gas, preferably carbon dioxide, at superatmospheric temperature into the closed vessel. Pressures of about 50-500 psig, preferably about 350-450 psig are utilized. While the required amount of gas is being introduced into the closed vessel, the liquid sugary melt is agitated to effect intimate contact between the gas and the melt. Sufficient gas is incorporated into the melt to provide 0.25-5.0 cc. of gas per gram of candy in the final product. The gasification is completed within a fairly short period of time. Usually less than about 10 minutes, normally 2 to 6 minutes, are sufficient. The required amount of mixing may be readily determined by those skilled in the art. For example, using a Parr bomb (a small pressure vessel equipped with a mixer) to prepare about 1,000 grams of melt, mixing speeds of 200-1500 rpm, preferably 500-900 rpm, have been found to be satisfactory.

The gasified melt is then permitted to solidify while maintaining the vessel under pressure. Bubbles of gas are entrapped in the solidified sugar. After the melt has solidified, the pressure is suddenly released which fractures the sugary mass into granulated pieces of a variety of sizes.

Finely divided pieces of gasified candy have poor compression properties so that tablets composed entirely of these particles, prepared by direct compression, are unsatisfactory in that the tablets are too soft and do not produce a sizzling effect from the gasified candy when eaten. Apparently, the pressure required to form a compact mass fractures the bubbles of gas in the gasified candy. The use of a particular type of binding agent whose moisture content is compatible with the gasified candy, not only produces a tablet with all the requisite tablet properties (hardness, friability, disintegration rate, etc.) but also produces a gasified candy confection which provides a pleasant sizzling sensation when eaten.

The excipient binder employed to produce the gasified candy confection of this invention may be selected from a class of materials known as carbohydrate materials. Such carbohydrate materials include monosaccharides, disaccharides and polysaccharides and among these, the most useful binding agents are chosen from the sugars and the starches. The sugar can include glucose, fructose, sucrose, maltose, lactose and the like, including mixtures of one or more of such sugars. Among the starches, the cereal starches are useful with cornstarch being preferred. Although unmodified granular starch may be employed, hydrolyzed starch is a more effective binding agent. A particularly preferred binder consists of a combination of sugar and starch, especially a combination of dextrose and cornstarch. This preferred binder is prepared by hydrolyzing cornstarch, spraying the hydrolyzed starch solution over finely divided particles of dextrose and then drying the coated dextrose to a low moisture content. The concentration of the starch in the dextrose should be about 2.0-4.0% and the moisture content of the dried particles should be less than 1.0%.

In addition to the useful sugars and starches listed above, the binding agents of U.S. Pat. No. 3,639,169 may also be usefully employed in preparing the gasified candy confections of the present invention. As disclosed therein, these materials include polyethylene glycols having a molecular weight of about 2,000 to 10,000, glycerol monostearate, sorbitol, lactose, mannitol, microcrystalline cellulose, fatty acids, instantized gums, proteins, starch, hydrolyzed polysaccharide derivatives, agglomerates of sugar in a matrix of noncrystalline sugar and a particulate composition of an inert diluent, such as mono and disaccharides, dispersed in a matrix of a hydrophilic, hydratable, polymer such as starch, agar, dextrin, cereal, flour and the like.

The excipient binder must have a moisture content that is compatible with the gasified candy, i.e., the moisture level of the binder must not be such that it would cause the gasified candy to soften to the point that the candy would lose its integrity and liberate the entrapped gas. It has been found that binders must have a low moisture content. A moisture level of about 1–2% has been found useful. Lower moisture levels of less than 1% have been found to be particularly useful.

Those skilled in the art can appreciate that not all of the excipient binders listed above produce the same results when used to prepare tablets of gasified candy. Some materials will perform more satisfactorily with a particular gasified candy or in a particular tableting process than others. The selection of the excipient binder will be dependent on a variety of factors. Thus the sugar composition of the gasified candy, its moisture content and particle size distribution, the processing conditions used to prepare the gasified candy, the flavorings, colorings and/or active ingredients in the gasified candy, the tableting process conditions, as well as the packaging and subsequent shipping and storage conditions can all influence the effectiveness of the particular excipient binder employed. It may be necessary, therefore, for the skilled artisan to evaluate several binders in a series of tableting runs before selecting a binder for a given gasified candy.

In preparing tablets of gasified candy according to the present invention any conventional direct compression tableting equipment may be used.

The following description describes a preferred embodiment of the present invention. To prepare the particularly preferred excipient binder a 8.5% aqueous solution of cornstarch is heated until the starch is hydrolyzed. The starch solution is sprayed over finely divided dextrose, such as a spray dried dextrose manufactured and sold by Edward Mendell Co. Inc. under the tradename EMDEX, until the concentration of the starch coating on the dextrose is about 2.0 to 4.0%. The starch coated dextrose is then oven dried at a temperature of about 140° F. until the moisture level is at the required low level of 1.0–2.0% or lower, i.e., below 1.0%. The starch-dextrose binder is then sieved to remove any large particles. Ideally the particle size distribution of the binder and the gasified candy is the same. Therefore the sieving of the binder should ideally produce a −20 to +40 U.S. Sieve Series product which is one of the preferred particle size of the gasified candy employed in the tableting process. Since the moisture content is as important for the quality of the tableted confection, the moisture level should be determined before the binder is mixed with the gasified candy. After achieving a satisfactory moisture content for the binder as explained herinbefore, a mixture of the dry ingredients is prepared by combining the starch-dextrose binder with finely divided (−20 to +40 U.S. Sieve Series) gasified candy, prepared as explained heretofore in a conventional solid-solid blender, such as a helical ribbon mixer, a double cone mixer or the like. If a lubricant is required, a material such as magnesium stearate, stearic acid or the like is added to the mixture. It has been found that formulations for the tablets of this invention comprise:

| Component | Broad % | Preferred |
|---|---|---|
| Gasified candy | 5–35 | 25–35 |
| Excipient binder | 65–95 | 65–75 |
| Lubricant | 0–1.5 | 0.8–1.2 |

The dry mix is fed to the dies of a single or rotary tableting machine. Direct compression pressures of 1800–2500 psig are employed. Since the higher pressure produces a harder tablet, the higher pressures are preferred provided the tablet produces the requisite sizzle from the gasified candy when it is eaten. Several simple tests can ready determine the ideal tableting pressure.

The confection of this invention may be prepared in predetermined geometry by employing tableting dies of the desired shape and size. Thus, the tablets may be round or square in varying diameters and thicknesses and can be produced, for example, as a $\frac{3}{4}''$ diameter$\times\frac{3}{8}''$ thick tablet.

The tablets of gasified candy of the present invention can serve as the finished product and thus may pass from the tableting equipment directly to packaing. Optionally, final coatings of a variety of types may be applied to the gasified candy tablets. For example, a hard coat of edible shellac or varnish, colored if desired, can be applied to the confection. In another embodiment a shiny, hard sugared coating may be applied by a procedure known in the confectionary industry as "pan coating" where the coating is applied and polished. In another embodiment a dry coating of sugar may be applied by a confectionary machine known as a "dry coater". Again, a polished coating of edible beeswax or carnauba wax may be applied, if desired, by procedures well known in the confectionary art.

The gasified candy of this invention may be packaged by wrapping the individual tablets and combining a number of these wrapped pieces in an outer wrapping or alternately, a number of tablets may be stacked and wrapped together in a package. Any of the packaging procedures well known in the confectionary art may be employed to produce the gasified candy tablets of this invention in packaged form.

The confection of this invention provides the candy lover with a pleasing organoleptic effect. By permitting the confection to dissolve in the mouth, a sustained sizzling is produced as the melting sugar gradually releases the entrapped gas.

The following examples illustrate the practice of this invention.

EXAMPLE I

A number of tablets of gasified candy were prepared by direct compression in a one-inch diameter die utilizing a hand press and were evaluated for hardness and sensory effect when eaten.

The gasified candy was prepared by gasifying the preferred sugar melt of a 40:40:20 mixture of sucrose, lactose and corn syrup with carbon dioxide at a pressure of about 400 psig. The gasified candy contained about 5 cc. of carbon dioxide per gram, had a moisture content of about 2.5% and was a finely divided state (−14 to +30 U.S. Sieve Series). A variety of excipients of a carbohydrate nature were also utilized. These were commercially available products which in some cases were treated to modify their binding and/or disintegrating properties. The excipients used included the following commercial products:

SUGARTAB, a mixture of sucrose (90–93 wt. %) plus invert sugar;

EMDEX, a spray dried dextrose;

CANDEX, a hydrolyzed starch product consisting mainly of dextrose plus a small amount of higher glucose, saccharides; and SWEETREX, a blend of natural sugars.

In some instances, varying amounts of such materials as gelatin and gum arabic were combined with the excipients under various tableting pressures to determine their effectiveness in producing a hard tablet which retained the sizzle effect of the finely divided gasified candy when permitted to dissolve in the mouth.

The results of these tableting evaluations are presented in Table I, below.

The dextrose was a spray dried dextrose in finely granulated form, produced and sold commercially as EMDEX by Edward Mendell Co., Inc. Although this dextrose is a good binder, and gasified candy tablets utilizing it as a binding agent provided a sizzling sensation when melted in the mouth, the disintegration and dissolution rate was too rapid. To impede the disintegration and dissolution and to improve the binding

TABLE I

| Run No. | Gasified Candy wt. % | Composition of Tablet Binder[1] Type | % | Lubricant[2] % | Tableting Pressure PSIG | Evaluation of Tablet Hardness | Sizzle |
|---|---|---|---|---|---|---|---|
| 1 | 100 | | | | 500 | Very soft | Good |
| 2 | 100 | | — | — | 700 | Soft | Slight |
| 3 | 100 | | — | — | 1000 | Soft | None |
| 4 | 50 | Sucrose | 50 | — | 1000 | Soft | Slight |
| 5 | 33 | Sucrose | 67 | — | 1000 | Soft | Slight |
| 6 | 20 | Sucrose | 80 | — | 1500 | Soft | Slight |
| 7 | 20 | Sucrose | 80 | — | 2000 | Hard | Less than slight |
| 8 | 34 | Dextrose & gelatin | 65.9 | 0.1 | 2000 | Hard | Low |
| 9 | 50 | Dextrose & gelatin | 49.9 | 0.1 | 1500 | Soft | Low |
| 10 | | Hydrolyzed starch & gum arabic | | | | Hard | Slight |
| 11 | | Natural sugar & gelatin | | | | Hard | Slight |
| 12 | | Sucrose & gelatin | | | | Hard | Slight |

[1](a) "Sucrose" - Commercial product of 90-93 wt. % Sucrose plus invert sugars.
(b) "Dextrose & gelatin" - Commercial spray dried dextrose dissolved with 10 wt % gelatin, dried, grounded & sieved.
(c) "Hydrolyzed starch & gum arabic" - Commercial hydrolyzed starch product (mainly dextrose plus small amount of higher glucose saccharides) sprayed with 1.85 wt. % gum arabic
(d) "Natural sugars & gelatin" - Commercial blend of natural sugars dissolved with 0.15 wt. % gelatin
(e) "Sucrose & gelatin" - (a) above dissolved with 0.3 wt. % gelatin.
[2]Runs 8 & 9 - Stearate compound These runs demonstrate that gasified candy can not be directly compressed alone satisfactorily without the use of a binding agent because the gasified candy is destroyed by the compression force used. A tablet of 100% gasified candy does not have satisfactory hardness but in addition and more importantly the gas bubbles formed during the gasification process are fractured during compression, resulting in a tablet with little or no sizzle or pop. Gasified candy requires a binding agent to produce a hard tablet. Further, although combining some excipients with gasified candy will provide a tablet with satisfactory hardness, the gasified candy did not provide a significant sizzle sensation when these tablets were eaten.

EXAMPLE II

In another series of runs, tablets of granulated gasified candy were prepared according to the procedure of Example I utilizing a combination of dextrose and starch as a binding agent. Again the hardness and sensory effects were evaluated.

characteristics, a known binder-disintegrant consisting of a hydrolyzed cornstarch was combined with the dextrose in the following fashion.

A 8.5% solution of cornstarch was heated until the starch was hydrolyzed. A quantity of the spray dried dextrose was placed in a stirred vessel and the hydrolyzed starch solution was sprayed over the dextrose until the concentration of the starch in the dextrose was 2.0-4.0%. The treated dextrose was then dried in an oven at 140° F. to a moisture level of less than 1.0%.

Varying amounts of the treated dextrose were mixed with the finely divided gasified candy in a series of direct compression tableting runs. In each run 0.1% of stearic acid or magnesium stearate was added to the ingredients to serve as a lubricant. In one tableting run a second excipient, sucrose plus invert sugar (available commercially as SUGARTAB), was employed. A range of tableting premises were employed for several of the formulations. As in Example I, each tablet was evaluated for hardness and sizzle. The results are presented in Table II below.

TABLE II

| Run No. | Gasified Candy wt. % | Composition of Tablet Binder[1] Type | % | Lubricant[2] % | Tableting Pressing PSIG | Evaluation of Tablet Hardness | Sizzle |
|---|---|---|---|---|---|---|---|
| 21 | 29.9 | Dextrose & Starch | 70 | 0.1 | 1800 | Semi-hard | Fair |
| 22 | 29.9 | Dextrose & Starch Sucrose | 35 35 | 0.1 | 2000 | Harder than above | Fair |
| 23 | 49.9 | Dextrose & Starch | 50 | 0.1 | 2000 | Very soft | Poor |

TABLE II-continued

| Run No. | Gasified Candy wt. % | Composition of Tablet Binder[1] Type | % | Lubricant[2] % | Tableting Pressing PSIG | Evaluation of Tablet Hardness | Sizzle |
|---|---|---|---|---|---|---|---|
| 24 | 19.9 | Dextrose & Starch | 50 | 0.1 | 2000 |  | Poor |
| 25 | 29.9 | Dextrose & Starch | 70 | 0.1 | 1500 | Soft | Fair |
| 26 | 29.9 | Dextrose & Starch | 70 | 0.1 | 2500 | Hard | Fair |
| 27 | 29.9 | Dexxtrose & Starch | 70 | 0.1 | 3000 | Very hard | Poor |
| 28 | 33 | Dextrose & Starch | 66 | 1.0 | 1500 | Soft | Good |
| 29 | 33 | Dextrose & Starch | 66 | 1.0 | 2000 | Fairly hard | Good |
| 30 | 33 | Dextrose & Starch | 66 | 1.0 | 2300 | Hard | Good |
| 31 | 33 | Dextrose & Starch | 66 | 1.0 | 2500 | Hard | Fair |

[1]"Dextrose & Starch" - Commercial spray dried dextrose treated with hydrolyzed cornstarch and dried to a moisture content at less than 1 wt. %.
[2]Runs 21-27: Stearic acid
Runs 28-31: Magnesium stearate This series of runs demonstrates that starch treated dextrose is a superior binder for finely divided gasified candy producing under appropriate tableting pressure for a given formulation, a hard tablet which provides a significant sizzling sensation when permitted to melt in the mouth.

What is claimed is:

1. A method of preparing a tableted confection of gasified candy which comprises:
    (a) preparing a melt of sugar,
    (b) gasifying the melt under superatmospheric pressure,
    (c) solidifying the gasified melt under pressure trapping bubbles of gas within the solid sugar,
    (d) sub-dividing the solid gasified sugar into finely divided particles,
    (e) admixing 5-35% of hard finely divided particles of gasified candy containing 2-7 cm$^3$ of gas per gram of candy and having a moisture content of between 1.0 and 5% with 64-95% of an excipient binder for the gasified candy said binder comprising carbohydrate material selected from the group consisting of sugars and starches and having a moisture content up to 2% water and
    (f) directly compressing the admixture of step (e) into a tablet under 1800-2500 psig, said quantity of binders being sufficient to provide substantial binding action to produce a tablet of gasified candy having
        (i) resistance to breaking and crumbling, and
        (ii) controlled disintegration to produce a sizzling sensation from the gasified candy when said tablet is contacted with moisture in the mouth.

2. A method according to claim 1 wherein an effective amount of tableting lubricant is added to the finely divided particles of step (e).

3. A method according to claim 1 wherein the gasified candy comprises glucose, fructose, sucrose, lactose, corn syrup or mixtures thereof.

4. A method according to claim 1 wherein the gasified candy comprises sorbitol.

5. A method according to claim 1 wherein the gasified candy additionally contains coloring, flavoring or active ingredient.

6. A method according to claim 1 wherein the gas in the gasified candy is carbon dioxide.

7. A method according to claim 1 wherein the carbohydrate material is dextrose coated with hydrolyzed starch and has a moisture content of below 1.0%.

8. A method according to claim 1, wherein the gas employed in step (b) is carbon dioxide.

9. A method according to claim 1, wherein step (b) comprises maintaining a $CO_2$ pressure of 50-500 psig while the melt of sugar at about 280° to 320° F. is uniformly agitated whereby the carbon dioxide and the sugar melt are brought into intimate contact.

10. The product produced by the method of claim 1.

* * * * *